United States Patent [19]

Klatt

[11] Patent Number: 4,625,841
[45] Date of Patent: Dec. 2, 1986

[54] POWER-ASSISTED TRANSMISSION HAVING A GEAR SHIFT SUPPRESSING ARRANGEMENT

[75] Inventor: Alfred Klatt, Wathlingen, Fed. Rep. of Germany

[73] Assignee: WABCO Westinghouse Fahrzeugbremsen GmbH, Hanover, Fed. Rep. of Germany

[21] Appl. No.: 557,788

[22] Filed: Dec. 5, 1983

[30] Foreign Application Priority Data

Dec. 8, 1982 [DE] Fed. Rep. of Germany ....... 3245405

[51] Int. Cl.⁴ .............................................. B60K 41/22
[52] U.S. Cl. ................................ 192/3.63; 192/30 W
[58] Field of Search .................... 192/3.63, 3.51, 3.61, 192/0.092, 0.048, 30 W, 3.62

[56] References Cited

U.S. PATENT DOCUMENTS

| 2,071,538 | 2/1937 | Kelley | 192/3.63 |
| 2,156,209 | 4/1939 | Thurber | 192/3.61 X |
| 2,365,732 | 12/1944 | Snow | 192/3.61 |
| 4,354,584 | 10/1982 | Reifinger et al. | 192/109 D X |
| 4,440,279 | 4/1984 | Schreiner | 192/91 A X |

FOREIGN PATENT DOCUMENTS

| 852342 | 10/1952 | Fed. Rep. of Germany. |
| 2733595 | 3/1978 | Fed. Rep. of Germany. |
| 2949186 | 6/1981 | Fed. Rep. of Germany ..... 192/3.63 |

*Primary Examiner*—Rodney H. Bonck
*Attorney, Agent, or Firm*—J. B. Sotak

[57] ABSTRACT

A power-assisted transmission with a gear shift suppressing arrangement in which the transmission is controlled so that the gears can only be changed when the clutch is completely disengaged. An electrical sensor senses and measures the movement of the clutch. The sensor is connected to an electronic evaluating circuit which controls the selection and the engagement of the gears. The evaluating circuit causes the disengagement of an old gear and initiates a serch for a newly selected gear when the clutch is depressed approximately two-thirds ($\frac{2}{3}$) of its full stroke. When the full clutch stroke has been reached, the newly selected gear is completely engaged. If the clutch is reengaged before the engagement of the newly selected gear, the transmission is shifted to the neutral position.

9 Claims, 1 Drawing Figure

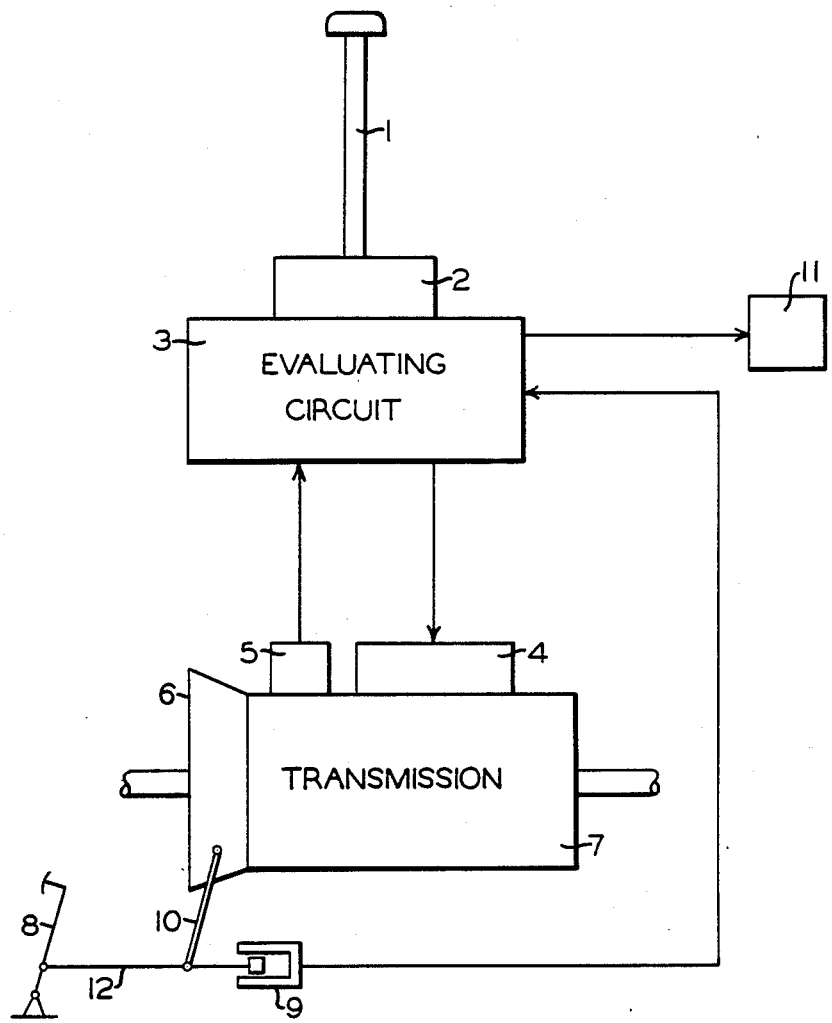

POWER-ASSISTED TRANSMISSION HAVING A GEAR SHIFT SUPPRESSING ARRANGEMENT

FIELD OF THE INVENTION

This invention relates to a power-assisted transmission having a gear shift suppressing arrangement and, more particularly, to apparatus for transmission of motor vehicles which senses when the clutch is depressed a given distance to disengage the old gear and to start searching for a newly selected gear, and which only causes the engagement of the newly selected gear when the clutch is fully depressed.

BACKGROUND OF THE INVENTION

In many transmissions, the gears are preselected by the driver with the gear shift lever, and then the selected gear is engaged by a power-assisted mechanism, such as, a hydraulically or pneumatically operated cylinder. The clutch can be manually operated directly by the driver, or automatically operated by the power-assisted mechanism.

Normally, it takes about 0.6 to 1.5 seconds to change gears. However, if the driver should forget to operate the clutch when shifting, the transmission can be damaged. Damages can also occur if the clutch is not properly operated, namely, if it is applied too quickly or is not completely disengaged when the gear-change occurs.

In order to prevent such damages, it has been previously suggested that the supply of pressure medium required for shifting gears can be shut off by a valve, which is opened only when the clutch is fully disengaged, as shown and disclosed in U.S. Pat. No. 4,354,584. The valve is thereby directly regulated or opened mechanically by the slave cylinder of the clutch.

Another conceivable arrangement has an electrical contact attached to the clutch, which is activated when the clutch is fully disengaged, and which controls an associated solenoid valve.

A disadvantage contained by these known arrangements is that a gear-change can only be initiated with a completely disengaged clutch, although the separation of the clutch linings sometimes occurs as early as two-thirds (⅔) of the clutch pedal travel. This wastes time, as mentioned above, but the transmission can be damaged if the clutch is reengaged too quickly.

SUMMARY OF THE INVENTION

The above-mentioned problems are alleviated by the present invention, which utilizes a power-assisted transmission of the type described above, and is completely protected against improper operation of the clutch, and which simultaneously initiates the shifting process very early to reduce the total amount of time required to shift gears.

Thus, it is an object of this invention to provide a new and improved gear shifting arrangement for transmissions of motor vehicles.

Another object of this invention is to provide a novel power-assisted transmission having a gear shift suppressing arrangement.

A further object of this invention is to provide a unique transmission for motor vehicles, which senses when the depressed clutch pedal reaches a given position for disengaging an old gear and for initiating a search for the newly selected gear, and which senses when the depressed clutch pedal reaches its fully-depressed position to cause engagement of the newly selected gear.

In accordance with the present invention, there is provided a power-assisted transmission for motor vehicles having a gear shift suppressing arrangement which controls the transmission so that a change of gears is possible only when the clutch is completely disengaged comprising, an electrical sensor for sensing the position of the clutch, the sensor is connected to an electronic evaluating circuit which controls the selection and the engagement of the gear, the evaluating circuit prevents the engagement of a newly selected gear when the clutch is still engaged, the evaluating circuit causes the disengagement of the old gear at some point of clutch movement which is less than the total clutch travel, and the evaluating circuit causes complete engagement of the newly selected gear only when the clutch is completely disengaged.

BRIEF DESCRIPTION OF THE DRAWING

These and other objects and advantages of the present invention will become more readily apparent when considered in conjunction with the accompanying drawing, wherein the single FIGURE shows a diagrammatic view of a transmission control system for motor vehicles.

DETAILED DESCRIPTION OF THE INVENTION

Referring now to the single FIGURE of the drawing, there is shown a gear shift lever 1 which can be manually operated by the driver of the vehicle. The position of the gear shift lever 1 is monitored by a shift sensor 2, and an appropriate signal is fed to an electronic evaluating circuit 3 which may be of conventional design. The evaluating circuit 3 is connected to a control unit 4 which contains the gear or speed selecting cylinder which causes the engagement of the desired gear in the transmission 7. When a gear-change is completed, a signal is transmitted by the acknowledging unit 5 to the evaluating circuit 3. The acknowledging unit 5 includes an appropriate number of sensors to readily recognize which one of the transmission gears is being presently requested as is well known to those skilled in the art.

It will be seen that the transmission 7 includes a clutch mechanism 6 which is operated by a pivotal lever arm 10. As shown, a clutch pedal 8 is linked to the lever arm 10 by a coupling rod 12. The position of the clutch 6 is sensed by means of an electronic sensing device 9 which is connected to the evaluating circuit 3. These types of sensors are shown and disclosed in U.S. Pat. No. 4,440,279. However, it will be appreciated that instead of employing an analog-type of position sensing device, it is possible to utilize a pair of electrical switches. The switches may be positioned on the clutch pedal 8 or on the clutch rods 10 or 12. The switches may be adjusted so that the one switch is tripped at approximately two-thirds (⅔) of the clutch travel, and the second switch is tripped at the full clutch travel.

It will be appreciated that the evaluating circuit 3 is designed to prevent the engagement of a new gear if, and when, the clutch 6 is not totally disengaged. This ensures that there is no possible damage to the transmission 7.

In order to shift gears, the driver selects the desired gear by moving the gear shift lever 1 and simultaneously steps on the clutch pedal 8. Thus, the clutch 6 is in the process of being disengaged. Now, as soon as the clutch has traveled two-thirds ($\frac{2}{3}$) of its length of travel, the evaluating circuit 3 causes the disengagement of the old gear and initiates the search for the newly selected gear. As soon as the clutch has traveled its full length, the clutch is completely disengaged, and the evaluating circuit 3 causes the complete engagement of the new gear.

It will be appreciated that the disengagement of the old gear and the search for a new gear is initiated when the clutch 8 is depressed approximately two-thirds ($\frac{2}{3}$) of its full stroke and the evaluating circuit 3 receives an appropriate signal that the movement of the clutch is in the direction toward the full stroke. The direction of movement of the clutch is sensed by the motion sensor 9. However, if the clutch is improperly operated, so that it has already been reengaged before the completion of a gear-change, the evaluating circuit 3 will cause the transmission 7 to shift into a neutral position at approximately two-thirds ($\frac{2}{3}$) of the clutch travel. Thus, the insertion into the neutral position prevents damage to the transmission 7.

When the clutch is returned from the fully-disengaged position before the conclusion of the gear-change, the evaluating circuit 3 causes the transmission to result in a rapid shift, namely, the gear shifting is power-assisted.

If a gear is selected without operating the clutch 6, an optical or acoustical warning device 11 is activated. This alerts the driver to use the clutch. Subsequently, the preselected gear is immediately engaged and the warning device is shut off.

Further, in order to increase the gear shifting operation, the motion sensor 9 may produce a shift signal at the one-half point instead of at the two-thirds point of the total motion of the clutch 8. Then, the evaluating circuit 3 will order the engagement of the newly selected gear.

It will be appreciated that various changes and modifications may be made to the present invention by those skilled in the art and, therefore, it is understood that all ramifications, alterations and equivalents which do not depart from the spirit and scope of the subject invention are herein meant to be covered by the appended claims.

Having thus described my invention, what I claim as new and desire to secure by Letters Patent is:

1. In a power-assisted transmission for motor vehicles having a gear shift suppressing arrangement which controls the transmission so that a change of gears is possible only when a clutch is completely disengaged comprising, an electrical sensor means for sensing the position of the clutch, said sensor means being connected to an electronic evaluating circuit means which controls the selection and the engagement of the gears, said evaluating circuit means prevents the engagement of a newly selected gear when the clutch is still engaged, said evaluating circuit means causes the disengagement of the old gear at some point of clutch pedal movement which is less than the complete clutch pedal movement, and said evaluating circuit means causes the complete engagement of the newly selected gear only when the clutch pedal finishes the complete clutch pedal movement.

2. In a power-assisted transmission, according to claim 1, wherein said evaluating circuit means brings about the disengagement of the old gear and indicates a newly selected gear when said sensor means measures a predetermined clutch pedal movement of approximately two-thirds ($\frac{2}{3}$) of the complete clutch pedal movement.

3. In a power-assisted transmission, according to claim 1, wherein said evaluating circuit means causes the disengagement of the old gear and initiates a search for the newly selected gear at approximately two-thirds ($\frac{2}{3}$) of the clutch pedal movement to the full clutch pedal movement and only if said sensor means senses that the direction of movement of the clutch pedal is toward the full clutch pedal movement.

4. In a power-assisted transmission, according to claim 1, wherein said sensor means is an analog motion sensor.

5. In a power-assisted transmission, according to claim 1, wherein said evaluating circuit means causes a rapid gear-change when the clutch pedal is released from the fully-depressed position before the completion of the gear-change.

6. In a power-assisted transmission, according to claim 1, wherein said evaluating circuit means causes a shifting of the transmission into the neutral position at approximately two-thirds ($\frac{2}{3}$) of the clutch movement if the clutch pedal is again engaged before the completion of the gear-change.

7. In a power-assisted transmission, according to claim 1, wherein when gears are attempted to be shifted without the simultaneous operation of the clutch, said evaluating circuit means activates a warning device.

8. In a power-assisted transmission, according to claim 7, wherein said evaluating means immediately engages the preselected gear and turns off the warning device when the clutch is subsequently activated.

9. In a power-assisted transmission for motor vehicles having a gear shift suppressing arrangement which controls the transmission so that a change of gears is possible only when a clutch is completely disengaged comprising, an electrical sensor means for sensing the position of the clutch, said sensor means being connected to an electronic evaluating circuit means which controls the selection and the engagement of the gears, said evaluating circuit means prevents the engagement of a newly selected gear when the clutch is still engaged, a signal is sent to said evaluating circuit means by said sensor means to cause the disengagement of the old gear when a clutch pedal movement is less than one-half of the complete clutch pedal movement, and said evaluating circuit means causes the complete engagement of the newly selected gear only when the clutch pedal finishes the complete clutch pedal movement.

* * * * *

UNITED STATES PATENT AND TRADEMARK OFFICE
CERTIFICATE OF CORRECTION

PATENT NO. : 4,625,841
DATED : December 2, 1986
INVENTOR(S) : Alfred Klatt

It is certified that error appears in the above-identified patent and that said Letters Patent are hereby corrected as shown below:

Column 4, claim 8, line 39, after "evaluating", insert

--circuit--

Signed and Sealed this

Seventh Day of April, 1987

Attest:

DONALD J. QUIGG

Attesting Officer

Commissioner of Patents and Trademarks